United States Patent [19]
DiSanto, Sr.

[11] Patent Number: 5,099,771
[45] Date of Patent: Mar. 31, 1992

[54] APPARATUS AND PROCESS FOR THE INCINERATION OF WASTE PARTICLES

[76] Inventor: Rocco J. DiSanto, Sr., 487 Brighton Ave., Portland, Me. 04102

[21] Appl. No.: 674,072

[22] Filed: Mar. 21, 1991

[51] Int. Cl.$^5$ ............................................. F23G 5/00
[52] U.S. Cl. ................................. 110/235; 110/222; 110/229; 110/232; 110/234; 110/346; 110/347
[58] Field of Search ............... 110/347, 346, 229, 222, 110/232, 234, 235

[56] References Cited

U.S. PATENT DOCUMENTS

| | | | |
|---|---|---|---|
| 4,900,401 | 2/1990 | Morton | 110/229 X |
| 4,981,089 | 1/1991 | Spliethoff et al. | 110/229 |
| 5,010,831 | 4/1991 | Halfhide | 110/347 |

Primary Examiner—Edward G. Favors
Attorney, Agent, or Firm—Thomas L. Bohan

[57] ABSTRACT

Apparatus and process for the complete breaking down and incineration of tires and other difficult-to-dispose-of-waste products in an energy-efficient manner. Small particles of the waste material are directed into a furnace of novel design. Within the furnace, the particles are incinerated and thereby converted to combustion gas products. The combustion gas products exiting from the furnace are then transferred to an energy recovery/utilization means, such as a boiler. The small particles are specifically directed into a coiled ignition tube located completely within the furnace. As the particles travel in a downwardly spiraling motion through the ignition tube they come in contact with its heat-conducting interior walls. By forcing the particles to contact the interior walls, the ignition tube of the present invention leads to an efficient incineration of those particles. Everything which exits the ignition tube at a lower section of the furnace, including any residual particles and any unoxidized gases, is drawn up past the hot ignition tube and out at upper section of the furnace. In this way, the effective dwell time at high temperatures ensures that the final particulate matter is consumed within the furnace. Additionally, the furnace may be contoured so that all gases and particles exiting the ignition tube are forced to contact the hot ignition tube's external walls.

46 Claims, 3 Drawing Sheets

APPARATUS AND PROCESS FOR THE INCINERATION OF WASTE PARTICLES

BACKGROUND OF THE INVENTION

1. Field of the Invention

The invention relates to an apparatus and process for the complete breaking down and incineration of tires and other hard-to-dispose-of waste products. More particularly, the invention relates to an apparatus and the process utilizing that apparatus for reducing to a very small size waste items which are very difficult to burn, and then incinerating those small particles. More specifically, the invention relates to an apparatus which includes a unique furnace design wherein the incineration of small particles within the furnace proceeds to the point that the particles are essentially completely burned. A heat recovery component of the invention is utilized to recover energy released by the incineration of the small particles.

2. Description of the Prior Art

It is well known that the disposal of waste rubber and plastic products—particularly old tires—is a problem of considerable concern, and has been for a number of years. In spite of a variety of plans aimed at the resolution of the problem, there exists a vast store of such waste products throughout the world and there is no indication that the store is diminishing. For example, the figure typically cited for the number of old tires dumped or otherwise disposed of in the United States alone is in excess of 200 million per year. For various reasons, the systems and devices currently utilized in the reduction of hard-to-burn waste materials are simply not satisfactory, in spite of the fact that most of the key problems are known.

There are a number of characteristics of rubber and plastic products which make their disposal quite difficult. First of all, they are comprised of extremely stable compounds. Although this stability makes them desirable, it also means that the time required for natural decomposition can extend over many hundreds of years. Secondly, such products generally are bulky and so tend to take up a considerable storage volume. The combination of their stable nature and bulkiness make them a waste-handling nightmare; they occupy a tremendous amount of space for a very long period of time. Another unfortunate characteristic of rubber and plastic products is their ignition-resistance—in part, because of the difficulty in breaking down the long-chain polymers—and the fact that when burned, their offgassing products are offensive and, in varying degrees, hazardous. However, these petroleum-based products have significant energy potential, and their burning, once initiated, continues for a long period of time—a serious threat in view of the vast piles of such waste products. These characteristics create further well-known problems in that when they are burned in bulk, or when they burn unexpectedly, they are environmental hazards of considerable public concern. This is readily apparent when one observes the attention focussed on any of the "mountains" of tires located throughout the country when it begins to burn.

One means utilized in the disposal of rubber tires is to chop or grind the tires into small pieces and use them as recyclable fillers in other products, such as blacktop for road surfaces. This method of disposal eliminates the environmental problems associated with waste burning; however, the volume of waste tires and other polymeric products far exceeds the volume of filler needed, and the gap is likely to widen. Therefore, alternative methods of disposal are still required if the goal is to cut down on the total volume of stored waste.

Currently, the most viable alternative to the recycling process described above—an alternative which is fairly well-known—is controlled burning of waste materials, by incineration or pyrolysis, wherein gas-cleaning equipment is used to overcome the offgassing problem. Incineration involves the oxidation of the material in an excess of air, while pyrolysis involves distillation of the material rather than combustion. Incineration provides a more complete break down of the waste in a shorter period of time, and unlike pyrolysis, it does not require an external fuel source to sustain the break down process. Specifically, incineration of waste tires and the like generally occurs at temperatures of about 1700° F.—well above their ignition temperature—while the same products are pyrolyzed at about 600° F. As a result, the by-products of incineration are primarily gases and unburned particulate matter, while the by-products of pyrolysis are a combination of gases, hydrocarbon liquids and particulate. The high temperature incineration products are immediately used to produce heat or electricity, while on the other hand, the products of pyrolysis—hydrocarbon gases and liquids—are often stored and used to produce energy at a later time. The two burning processes reduce waste material, but they do so in different ways and they result in essentially different products. The selection of one process over the other is generally determined by the product one wishes to obtain from the waste materials. It should be noted, however, that in most prior art incineration devices, high-temperature incineration naturally produces more undesirable nitrogen oxides than does the pyrolysis method. Therefore, if the goal is simply to reduce the volume of waste rather than create a particular by-product, the nitrogen oxide problem must be considered.

Kutrieb (U.S. Pat. No. 4,507,174 issued Mar. 26, 1985) and Roy (U.S. Pat. No. 4,740,270 issued Apr. 26, 1988) both describe pyrolysis devices for the reduction of waste tires to storable hydrocarbon by-products, wherein the by-products may be utilized to produce energy. It is readily apparent from these disclosures that a considerable amount of support equipment is required to make pyrolysis viable. Such equipment includes, but is not limited to, complex reaction chambers, compressors, storage means, and gas scrubbing means. There exists then a problem with such devices in that they require a considerable amount of energy to be operated and so they are generally not energy efficient. For this reason, such devices are of little practical usefulness; they comprise at present a very uneconomical means for disposing of the waste materials in question.

Incineration, on the other hand, generally requires less supplemental equipment, primarily because the resultant high-temperature products of combustion-carbon dioxide, gaseous water and traces of hydrocarbons and nitrous oxides—are used immediately to produce energy. Typically, this is achieved by linking an incineration furnace to a boiler and creating hot water or steam. For that reason, compressors and storage means are not required. A device for the incineration of waste rubber and plastic products is described by Eriksson et al. (U.S. Pat. No. 4,469,034 issued Sept. 4, 1984). Eriksson emphasizes the problem of nitrous oxide emissions associated with the incineration of such waste materials, and indicates that the utilization of small particles increases the incineration efficiency and reduces the amount of excess air required to oxidize the waste material. The reduction in the amount of air required leads to a reduction in the volume of nitrous oxides emitted by the device. Although burning of small particles is a well-known disposal method, as illustrated by the fluidized-bed combustion device described by Habib (U.S. Pat. No. 4,588,477), Eriksson discloses a cyclone furnace wherein the particles swirl within the furnace in a downward spiraling motion for an extended period of time, and the amount of air used to carry out the combustion process is regulated.

The Eriksson process and apparatus improve upon other prior art devices in that small particles burn more easily than bulk products. In addition, the reduction in the amount of combustion air introduced to the furnace minimizes the output of nitrous oxides. However, the heat transfer method utilized by Eriksson is not as efficient as it could be. Specifically, the heat needed to ignite the particles is radiated to those particles from the walls of the furnace which are actually some distance away from the particles themselves. Although the particular technique of spiraling the particles as described by Eriksson is useful, radiating heat through air to those particles is less efficient than conducting heat to the particles, principally because the air has a relatively low heat capacity. Another problem associated with the Eriksson process and apparatus is that larger particles of rubber waste are not caught in the swirling air; instead, they drop right to the bottom of the furnace and are then carried along with the combustion gases to a boiler connected to the furnace. It is anticipated that within the boiler essentially all of the remaining particles will eventually burn completely. Still another problem with the Eriksson device relates to the design of the cyclone furnace itself. Specifically, the furnace has "dead spots" in which the flue gas (the resultant product of the incineration of the waste particles) can dwell for extended periods of time without performing any useful function. These dead spots are in the corners of the furnace, and there may be a dead spot at the center of the spiraling path of particles. Finally, Eriksson states that in order to completely burn 90% of the rubber particles within the device described, those particles must be no greater than 1.5-2 millimeters in size. This size limitation means that an additional step is required to ensure that the particles can be completely burned. All of these problems lead to inefficient consumption of the waste particle fuel source.

In spite of these problems, Eriksson highlights the importance of burning waste materials in particle form rather than in bulk. Also, Eriksson shows that regulation of the air input, and burning of the particles at temperatures just above the combustion temperature of the waste material, minimizes the formation of hazardous offgases such as nitrous oxides. Nevertheless, as discussed above, the device described by Eriksson has inefficiencies which in all likelihood make it economically unacceptable. Therefore, in order to provide a means of burning waste materials in an economically efficient manner, what is needed is a process and apparatus wherein the means utilized to ignite waste particles has a greater heat transfer capacity than hot air. Also, what is needed is a process and apparatus wherein all waste particles proceed through incineration in the same manner and wherein all particles are burned completely within the furnace, regardless of any variations in size—that is, within certain reasonable limits. Further, what is needed is a process and apparatus wherein the furnace is designed such that there are no dead spots in which the resultant gases of incineration dwell within the furnace. Still further, what is needed is a process and apparatus wherein the size of the waste particles to be burned can vary significantly—from powder size to crumb size. Finally, what is needed is a completely integrated system wherein hard-to-dispose-of waste products may be broken down to particle size and the particles completely burned to yield a high-temperature combustion product the heat of which is recoverable by energy recapture means.

SUMMARY OF THE INVENTION

The process and apparatus of the present invention overcome the problems associated with the prior art methods and devices for the disposal of waste materials which are otherwise difficult to handle. The present invention relates to incineration devices only, since it is believed that such devices offer a more efficient method of recovering energy from difficult-to-dispose-of waste materials. The present apparatus operates in a simple and efficient manner to incinerate such materials completely.

An object of the present invention is to conduct heat to particles of said waste utilizing a heat transfer medium with greater heat capacity than hot air. Another object of the present invention is to provide a path for the waste particles such that all particles—regardless of their size—contact the heat transfer medium in the same manner. Still another object of the present invention is to provide a modified furnace which is optimally designed to eliminate all dead spots such that essentially all of the hot gases produced by the incineration of waste particles are transferred to heat recovery means. Still further, an object of the present invention is to use the heat content of the ignited waste material, rather than a supplemental fuel, as the continuing source of ignition of waste material entering the apparatus. Another object of the present invention is to provide an apparatus wherein particles ranging in size from powder form to strips about one centimeter in length, are essentially completely burned. Finally, it is an object of the present invention to provide a completely integrated system wherein waste matter is broken down into particles, the particles are burned, and the heat of combustion is recovered.

Through novel furnace design, and utilization of a unique particle transfer means, the present invention overcomes the inefficiency flaws associated with the prior art incineration devices. The integrated system described herein operates in an economically efficient manner by first reducing the waste material to particle size in order to increase the surface area of the waste which contacts a heat transfer medium of high thermal conductivity contained within the furnace. Next, the waste particles are introduced to the heat transfer medium in a manner which significantly increases the rate at which those particles are ignited and the rate at which they burn. This increase is achieved by ensuring that essentially all of the particles come in contact with the interior portion of the heat transfer medium as they pass through the medium. The heat transfer medium is positioned within the modified furnace such that oxidized and unoxidized gases, and any remaining particulate matter, exit the heat transfer medium at a bottom portion of the interior of the furnace and are forced up past the exterior of the heat transfer medium. This method ensures that any remaining unoxidized gas and particulate matter are completely burned as they come in contact with the heat transfer medium and before they pass to the heat recovery means.

In operation, the integrated system of the present invention first converts the bulk waste material to small particles, with the particle size varying from powder form to about one-centimeter long strips. The means utilized to convert the material to particle size is dependent upon the material to be burned. For example, if tires are to be disposed of, it is contemplated in the present system that the tire bead, which comprises a considerable amount of steel, would first be removed. Next, some grinding means may be used to remove essentially all of the rubber from the tire carcass. The tire carcass can also be converted to particle size, provided that steel components are removed before the particles are introduced to the furnace. Additional grinding may be performed if the initial particle size is considered to be too large for an efficient burning.

The combustible particles are then moved to the heat transfer medium, which in the present invention is a coiled ignition tube. The ignition tube is located within the modified furnace and is initially preheated to the ignition temperature of the waste matter, which for tire material is about 1200° F. The waste particles are then directed through the ignition tube, mixed with a proportionate volume of air, and ignited as they spiral downward. Since it is contemplated that the system of the present invention will be utilized to completely burn materials which are difficult to burn, it is critical that the particles come in contact with the interior surfaces of the ignition tube. This is necessary because these materials are generally insulative in nature. As such, the heat exchange from the burning exterior of each particle to the unburned interior portion of the particle occurs slowly. If the particle does not remain in the furnace long enough, or if a transfer medium with low heat capacity is utilized to transfer heat to the particle, insufficient heat transfer to the particle may occur and that interior portion may never reach ignition temperature. For this reason, the ignition tube of the present invention is formed of a thermally-conductive material, such as steel, ceramic-coated steel, or something at least as conductive. Additionally, a thermally-conductive heat transfer medium provides a continuing source of heat for the combustion of all combustible products within the furnace. The diameter of the tube, the diameter of the coil formed, and the number of loops comprising the coil may be varied as a function of the material to be burned and the quantity of that material to be burned.

Another feature which enhances the transfer of heat to the particles is the coiling of the ignition tube. Because the tube is coiled, the particles remain within the furnace and in contact with the interior walls of the ignition tube for an extended period of time. This extended dwell time, which is necessary to burn the particles completely, is achievable within a furnace which is much smaller than would otherwise be required to conduct the necessary heat to the particles. In addition to achieving the longer particle dwell time, the coiling of the ignition tube enhances the burning process and permits that process to be self-sustaining. Initially, the interior of the furnace—which includes the ignition tube—is heated by conventional means to the ignition temperature of the waste particles to be burned. The particles are then introduced to the ignition tube where they are ignited. As ignited particles travel down through the tube, the energy released from the exothermic combustion reaction further heats the tube. Since heat is more efficiently radiated between thermally-conductive elements than between insulative elements, the heat from the hot lower rings of the coil is quickly transferred to the cooler upper rings of the coil. The increased coil temperature results in an increase in the ignition of the particles nearer the upper cooler portion of the ignition tube. In a short period of time the entire coil reaches a steady-state operating temperature, which is self-sustaining and which results in an increased particle burn rate, all without the need to go to a supplemental fuel source to sustain the combustion. Further, the particle pass-through rate can be adjusted as a function of the burn rate, which in turn is a function of the particular waste material, the size of the particles, and the configuration of the ignition tube. This adjustment results in an increase in the efficiency of the system.

Another key feature of the present invention is the means by which the particles are introduced to the ignition tube. They are introduced such that they swirl within the tube and are forced to the interior walls of the tube. This swirling extends the time that the particles are in contact with the hot ignition tube surfaces. Although prior art devices have disclosed swirling of the particles within a furnace so as to extend the dwell time, none have indicated the usefulness of creating that swirling effect within a medium of high heat transfer capability, and thus to tightly contain the burning particle stream. For this reason, the procedure disclosed herein is more efficient than prior incineration devices. Further, the means by which the particles are introduced to the ignition tube permits swirling of all particles—regardless of their size—within the tube such that they all contact its interior surfaces. This feature also makes the present invention more efficient than the prior art devices.

Still another feature of the present invention which makes it more efficient than the prior art devices is the design of the furnace which contains the ignition tube. The furnace of the present invention comprises interior walls made of refractory material shaped to conform to the general shape of the ignition tube. This enhances the efficiency of the system because it reduces dead spots within the furnace and thereby increases the thoroughness of the burning. Although the ignition tube component of the present invention makes the system a more efficient means for burning hard-to-burn materials, it is contemplated that not every single particle entering the tube will be completely oxidized to combustion gases. In fact, it is expected that there will be unburned particles and combustible gases such as carbon monoxide and methane exiting the ignition tube in the bottom portion of the furnace. It is also expected that these undesirable by-products could be exhausted to the atmosphere without ever being completely incinerated. Apart from the possibility that incomplete incineration occurs as a result of an insufficient quantity of combustion air within the furnace, the incomplete incineration may be the result of permitting those by-products to dwell in cold spots within the furnace before being exhausted from the furnace. However, the interior walls of the furnace of the present invention closely conform to the outer diameter of the coiled ignition tube such that everything exiting the ignition tube is forced to come in contact with the exterior surface of the hot ignition tube as it is drawn back up around the tube and into the upper portion of the furnace.

The furnace of the present invention also comprises a plug positioned within the inner diameter of the coiled ignition tube. This coil plug is essentially shaped to conform to the inside diameter of the coil shape of the ignition tube and it may be made of ceramic or some other heat-resistant material. In operation the furnace plug forces all matter exiting up through the center of the tube to contact the tube's hot exterior surfaces as that matter moves to the upper portion of the furnace. In this way, any remaining particulate, or any unoxidized gas components may be incinerated more readily. In order to maximize this final incineration step, supplemental air may be introduced to the furnace via a supplemental air inlet.

The novel ignition tube feature and the unique design of the furnace gives any unburned particles and any remaining combustible gases additional dwell time before they exit the incineration portion of the system. Because of this, the present invention can be used to completely burn particles which vary in size to a considerable degree—that is, particles ranging from powder size to strips which are about one centimeter in length.

As the combustion products are drawn from the furnace—at temperatures which may be in excess of 2500° F.—they are introduced to tome type of well-known heat recovery means, such as a boiler, a hot water heater, or some other type of heat exchanger. Through the use of such means, the energy content released from the waste materials which have been particlized and incinerated can be recovered. The reduced-temperature combustion products may also be used to warm the inlet air which is mixed with the waste particles entering the ignition tube.

It is also contemplated that a catalyst may be incorporated into the interior wall of the ignition tube. The catalyst, which would vary as a function of the type of waste material to be incinerated, would reduce the temperature at which particle ignition would occur—perhaps to as low as 700° F. for rubber tire material. As has been noted, when the incineration takes place at reduced temperatures, there is a reduction in the volume of nitrous oxides emitted.

The foregoing objects and features and other advantages of the integrated system of the present invention will become more clearly apparent upon reference to the following drawings and detailed description of the preferred embodiment.

DETAILED DESCRIPTION OF THE PREFERRED EMBODIMENT

Figure 1:
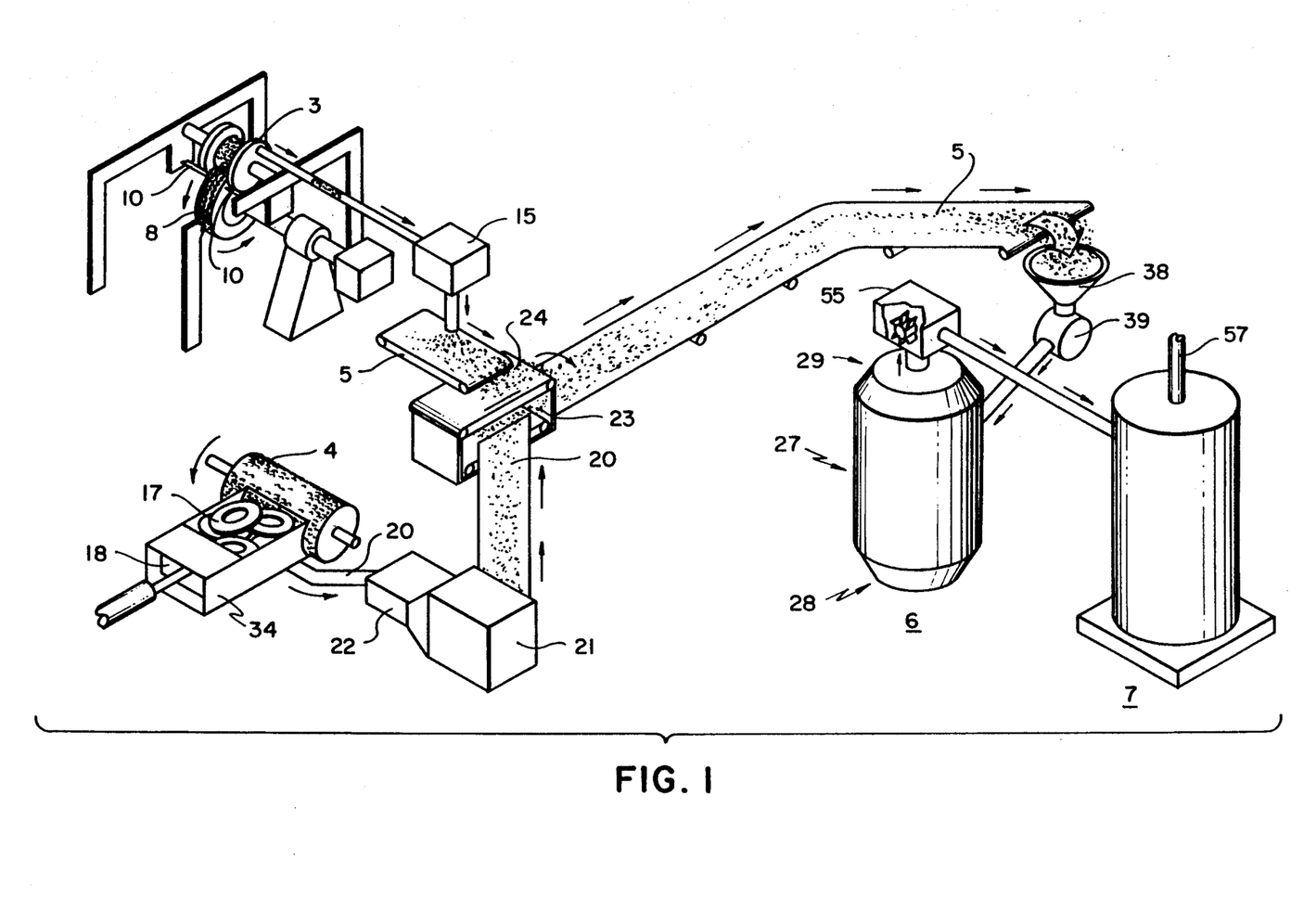
FIG. 1 is a schematic diagram of the preferred embodiment of the integrated system of the present invention, utilized to break down and incinerate of waste materials.

An integrated system 1 for breaking down and incinerating waste materials is illustrated in FIG. 1. Although the preferred embodiment of said integrated system 1 as described herein specifically refers to the incineration of waste rubber tires, it is to be understood that a wide range of other difficult-to-dispose-of waste materials may be broken down and incinerated in a similar manner in a similar system. Any changes that may be required for specific materials will become readily apparent to those of ordinary skill in the art upon review of this description.

Referring now to FIG. 1, said integrated system 1 of the present invention comprises a tire-bead removal device 2, a primary grinding device 3, a secondary grinding device 4, particle conveying means 5, particle incineration means 6, and heat recovery means 7. Generally stated, the process of the present invention comprises first placing a waste tire 8 on said tire-bead removal device 2 and cutting away tire beads 9 of said waste tire 8 utilizing debeading knives 10. Next, a contoured grinding wheel 11 of said primary grinding device 3 grinds sidewalls 12 and tread 13 of said waste tire 8 down to a tire carcass 17, thereby forming primary waste particles 14. Said primary waste particles 14 are removed from said contoured grinding wheel 11 by primary vacuum means 15 and directed onto said particle conveying means 5. Said tire carcass 17 is transferred into said secondary grinding device 4. Within said secondary grinding device 4, a hydraulically-driven head plate 18 forces said tire carcass 17 to contact a secondary grinding wheel 19, thereby grinding said tire carcass 17 into secondary waste particles 20. Said secondary waste particles 20 are vacuumed from said secondary grinding wheel 19 by secondary vacuum means 22 and first directed to a metal separator 21 where any metal within said secondary waste particles 20 is removed. All non-metallic materials of said secondary waste particles 20 are then directed onto said particle conveying means 5. Said particles 14 and 20 are then mixed together within a storage container 23 to form disposable waste particles 24. Said disposable waste particles 24 are then conveyed to said particle incineration means 6. Within said particle incineration means 6 said waste particles 24 are combined with air, ignited within an ignition tube 25 at a temperature of about 1200° F., and incinerated to form combustion gas products 26. Said gas products 26 exit said ignition tube 25 within a bottom furnace portion 28 of a modified furnace 27, which in the preferred embodiment is a contoured furnace 27, at a temperature of about 2500° F. Said combustion gas products 26 then exit said contoured furnace 27 via an upper furnace portion 29 and enter said heat recovery means 7 where the heat from said combustion gas products 26 is utilized to form steam or hot water.

Figure 2:
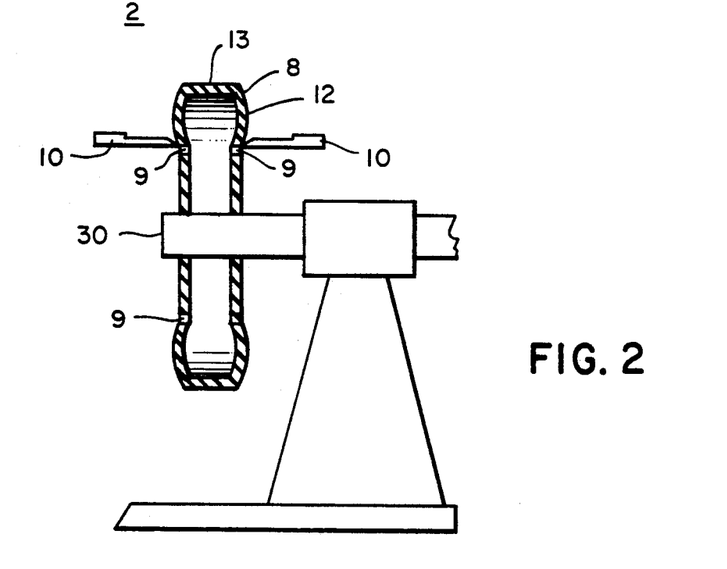
FIG. 2 is an end view of a tire debeader of the preferred embodiment of the present invention.
Figure 3:
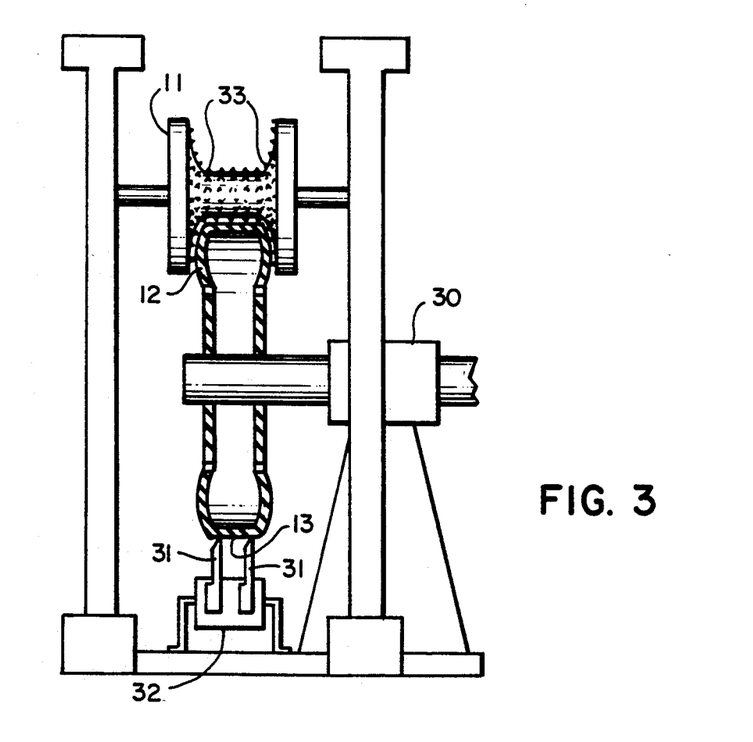
FIG. 3 is an end view of a primary grinder of the preferred embodiment of the present invention.

Referring to said tire-bead removal device 2 as illustrated in FIG. 2, said waste tire 8 is mounted on a spindle 30 in an upright position, and said debeading knives 10 are mechanically pressed against said sidewalls 12 just beyond said tire beads 9. As said waste tire 8 is spun about on said spindle 30, said tire beads 9 are cut away. Once said tire beads 9 have been removed, said primary grinding device 3 is utilized to remove the bulk of the rubber remaining on said waste tire 8. As illustrated in FIG. 3, tread-cutting knives 31 extending from a rotating knife wheel 32 are mechanically pressed against said tread 13 of said waste tire 8 as said waste tire 8 is spinning on said spindle 30. Said tread-cutting knives 31 operate to shred the rubber of said tread 13, thereby making the task of primary waste particle 14 formation somewhat easier. While said tread-cutting knives 31 are shredding said tread 13, said contoured grinding wheel 11 is lowered down onto said waste tire 8 as said waste tire 8 continues to spin on said spindle 30. In the preferred embodiment of the present invention a primary tire-contacting surface 33 of said contoured grinding wheel 11 is a Tungsten-Steel-Carbide abrasive. It is to be understood that equally appropriate abrasives may be used without straying from the process described herein. Further, said primary tire-contacting surface 33 may be an integral component of said primary grinding wheel 11, or it may be removable. Said contoured grinding wheel 11 is about three feet long and is preferably contoured to provide contact between said primary tire-contacting surface 33 and the entirety of said sidewalls 12 and said tread 13.

Figure 4:
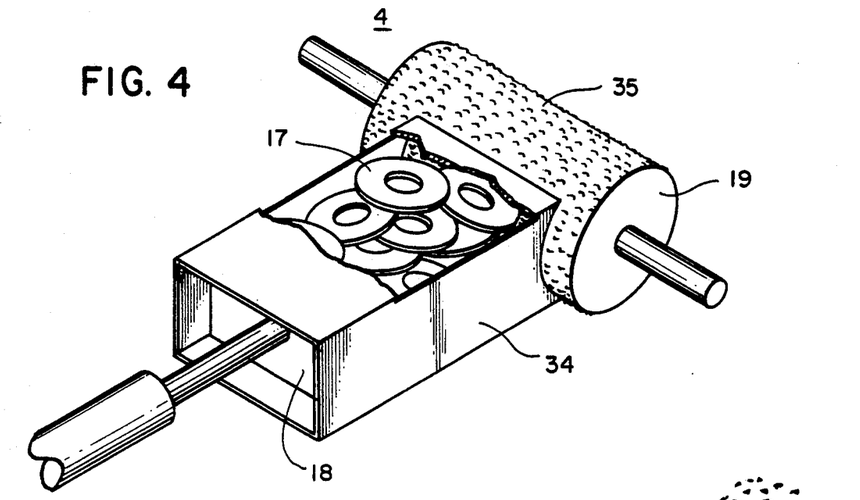
FIG. 4 is a perspective view of a secondary grinder of the preferred embodiment of the present invention.

As previously noted, said primary vacuum means 15 draws said primary waste particles 14 from said waste tire 8 and from said tire-contacting surface 33 of said contoured grinding wheel 11 and directs them onto said particle conveying means 5. Said primary waste particles 14 are then conveyed by said particle conveying means 5 to said storage container 23. In the meantime, the grinding of said waste tire 8 by said contoured grinding wheel 11 is discontinued when essentially all rubber of said sidewalls 12 and said tread 13 has been removed. Said tire carcass 17 is then transferred to said secondary grinding device 4. When a sufficient quantity of tire carcasses 17 fill a carcass chamber 34 of said secondary grinding device 4, said hydraulically-driven head plate 18 forces said tire carcasses 17 to contact said secondary grinding wheel 19, as illustrated in FIG. 4. In the preferred embodiment of the present invention, said carcass chamber 34 is about 20 feet long by about 10 feet wide by about 10 feet deep. Said secondary grinding wheel 19, which may also be faced with a Tungsten-Steel-Carbide abrasive, has a diameter of about 12 feet, is about 14 feet long, and is water-cooled. As with said primary tire-contacting surface 33, a secondary grinder surface 35 may be an integral component of said secondary grinding wheel 19, or it may be removable.

Figure 5:
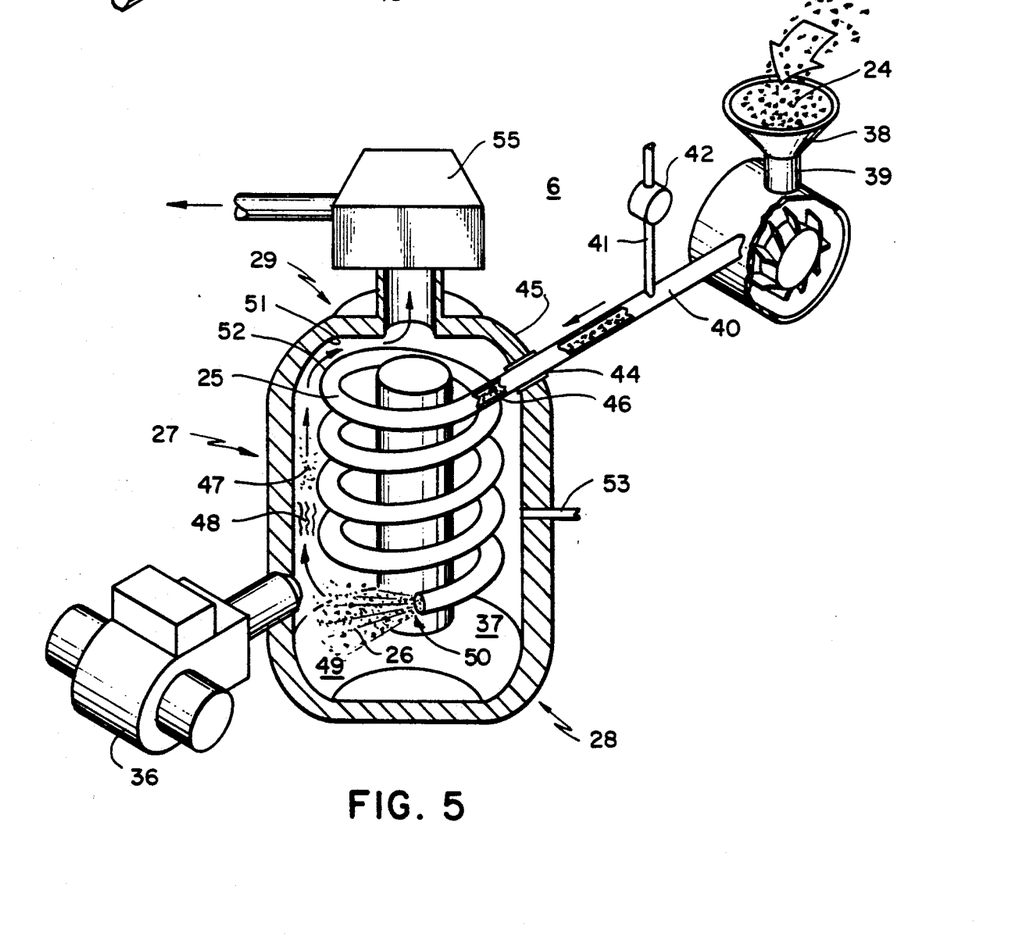
FIG. 5 is a side view of the particle transfer means, the furnace and the ignition tube of the preferred embodiment of the present invention.

After any metal elements from said tire carcasses 17 have been removed from said secondary waste particles 20, and said secondary waste particles 20 have been conveyed to said storage container 23, said secondary waste particles 20 are combined with said primary waste particles 14 to produce said disposable waste particles 24. Prior to introducing said disposable waste particles 24 to said particle incineration means 6, a burner gun 36 affixed to said contoured furnace 27 is used to heat a contoured furnace interior 37, as illustrated in FIG. 5. In the preferred embodiment of the present invention said burner gun 36 may either be an oil-fired or a gas-fired burner gun. When the temperature within said contoured furnace interior 37 is measured to be in excess of 1200° F. (or the appropriate ignition temperature for the particular waste material to be burned) said disposable waste particles 24 are conveyed to a particle hopper 38 positioned above and to one side of said contoured furnace 27. From said particle hopper 38 said disposable waste particles 24 are metered into a squirrel-cage fan 39 with an electric squirrel-fan motor 43, or some other type of blower system. Said squirrel-cage fan 39 first mixes said disposable waste particles 24 with air and then blows the mixture down a particle delivery tube 40, which in the preferred embodiment is about 2 inches in diameter and may be made of steel. Centered in said particle delivery tube 40 is a venturi tube 41 with an air control valve 42. Said venturi tube 41 may be a ⅛-inch copper tube. Strictly-regulated air from said venturi tube 41 mixes with and adds to air from said squirrel-cage fan 39 to enhance the combustion of said disposable waste particles 24. In addition, said venturi tube 41 creates a partial vacuum, thereby assisting the movement of said disposable waste particles 24 down said particle delivery tube 40.

Said particle delivery tube 40, said venturi tube 41, and said control valve 42 are all components of said particle incineration means 6 and are all positioned outside of said contoured furnace 27. A delivery tube connector 44, preferably made of heat-resistant steel, ceramic-coated steel, or ceramic, extends through an upper exterior furnace wall 45, and connects said delivery tube 40 to said ignition tube 25, which is located within said contoured furnace 27. Said disposable waste particles 24 enter said ignition tube 25 in a swirling motion caused by the venturi effect and are immediately forced to contact interior ignition tube walls 46. In the preferred embodiment of the present invention, said ignition tube 25 is about 2 inches in diameter, is made of heat-resistant steel, ceramic-coated steel, or ceramic, and is coiled into three loops to form a coil which has an inside diameter of about 20 inches. As said disposable waste particles contact said interior ignition tube walls 46 they are ignited. As they spiral downward through said ignition tube 25, said disposable waste particles 24 continue to contact said interior ignition tube walls 46 and other unburned particles, and are converted to said combustion gas products 26.

Although substantially entirely converted to said combustion gas products 26, there may exist residual particles 47 and unoxidized gas components 48 entering a lower interior furnace section 49 from an ignition tube exit port 50. Since contoured interior furnace walls 51 are in close proximity to said ignition tube 25, said residual particles 47 and said unoxidized gas components 48 come either in contact with said interior furnace walls 51—which are preferably made of refractory material, brick or blanket—or said exterior ignition tube walls 52, as they exit said contoured furnace 27. If necessary, supplemental air inlet means 53 may be incorporated into the design of said contoured furnace 27 to provide additional air for complete combustion of said residual particles 47 and said unoxidized gas components 48. Said combustion gas products 26 are then drawn from said contoured furnace 27 through a furnace gas exit port 54 located at said upper furnace portion 29 by a combustion gas fan 55. The process of drawing everything from said lower interior furnace section 49 up past the entire height of said ignition tube 25 to said upper furnace portion 29 permits said residual particles 47 and said unoxidized components 48 to remain within said contoured furnace 27—in close proximity to said ignition tube 25—for an extended period of time, thereby increasing the likelihood that all of said disposable waste particles 24 will be converted to combustion gas products 26. Further, by drawing said combustion gas products 26 and other items past said ignition tube 25 at a temperature in excess of 2500° F. said ignition tube 25 does not cool down; instead, said disposable waste particles 24 are ignited almost as soon as they enter said contoured furnace 27. As part of the method of forcing said combustion gas products 26, said residual particles 47 and said unoxidized components 48 to pass near, and in contact with, said ignition tube 25, a solid coil plug 56 is placed within the center of the coil formed by said ignition tube 25. Said coil plug 56 is about 18 inches in diameter, is equal in height to said coiled ignition tube 25, and is preferably made of heat-resistant steel, ceramic-coated steel, or ceramic material.

The final step in the process utilizing said integrated system 1 is well known. Specifically, said combustion fan 55 directs said combustion gas products 26 to said heat recovery means 7 where heat is either used or converted to electricity. If desirable, said combustion gas products exiting said heat recovery means 7 may be directed to warm said inlet air entering said delivery tube 40 through said venturi tube 41. Finally, spent combustion gas products 26 are directed to a gas exhaust stack 57.

Although the preferred embodiment of the apparatus and process of the present invention have been described herein, it is to be understood that such a description is merely illustrative and as such should not be seen as a limitation of the invention. It should be apparent to those of ordinary skill in the art that component substitutions and process variations may be made without varying from the operating principles of the invention.

I claim:

1. Apparatus for incinerating difficult-to-dispose-of waste products, said apparatus comprising:
   a. particle delivery means;
   b. a modified furnace; and
   c. combustion product withdrawal means,
wherein said particle deliver means transfers small particles of said waste products from waste particle storage to an ignition tube positioned within said modified furnace, wherein said ignition tube is connected to said particle delivery means through an upper furnace wall, wherein said ignition tube is looped into a coil shape such that said small particles travel through said ignition tube in a downwardly spiraling motion and such that said small particles travelling through said ignition tube contact interior ignition tube walls of said ignition tube, wherein said combustion product withdrawal means is affixed to said modified furnace, wherein said combustion product withdrawal means removes combustion gas products formed by the incineration of said small particles from said ignition tube at a lower furnace section such that said combustion gas products are directed up past said ignition tube to contact exterior ignition tube walls of said ignition tube, and wherein said combustion gas products are transferred out of said upper furnace section and into heat recovery means.

2. The apparatus as claimed in claim 1 further comprising waste product size-conversion means, wherein said waste product size-conversion means converts bulk waste products into said small particles of said waste products.

3. The apparatus as claimed in claim 2 wherein said waste product size-conversion means is a grinder means.

4. The apparatus as claimed in claim 1 wherein said modified furnace is a contoured furnace such that said contoured furnace substantially conforms in shape to an outside diameter of said coil shape of said ignition tube, wherein the shape of said contoured furnace forces said hot combustion gas products exiting said ignition tube to be in close proximity to said exterior ignition tube walls.

5. The apparatus as claimed in claim 1 further comprising a supplemental air inlet of said modified furnace wherein the incineration of any residual particles and any unoxidized gas components exiting said ignition tube may be aided by the addition of supplemental air from said supplemental air inlet.

6. The apparatus as claimed in claim 1 further comprising a coil plug positioned within an inside diameter of said coil shape of said ignition tube, wherein said coil plug substantially conforms to the shape of said inside diameter of said coil shape of said ignition tube, and wherein said coil plug prevents said combustion gas products, any residual particles and any unoxidized gas components from exiting said modified furnace through the center of said coiled ignition tube.

7. The apparatus as claimed in claim 6 wherein said coil plug is made of heat-resistant steel.

8. The apparatus as claimed in claim 6 wherein said coil plug is made of ceramic-coated steel.

9. The apparatus as claimed in claim 6 wherein said coil plug is made of ceramic material.

10. The apparatus as claimed in claim 1 wherein said particle delivery means comprises:
    a. a waste particle hopper;
    b. particle blowing means;
    c. a particle delivery tube;
    d. a venturi tube; and
    e. a delivery tube connector,
wherein said small particles of said waste products are conveyed from said waste particle storage to said waste particle hopper, wherein said waste particle hopper is positioned above said modified furnace, wherein said particle blowing means is connected to said waste particle hopper, wherein said small particles are metered from said waste particle hopper into said particle blowing means, wherein said particle blowing means blows an air-particle mixture into said particle delivery tube, wherein said venturi tube is affixed to, and centered in, said particle delivery tube, wherein said venturi tube creates a partial vacuum within particle delivery tube, thereby assisting the movement of said mixture through said particle delivery tube and into said ignition tube, wherein said delivery tube connector extends through an upper exterior wall of said modified furnace, and wherein said delivery tube connector connects said particle delivery tube to said ignition tube.

11. The aparatus as claimed in claim 10 wherein said particle blowing means is a squirrel-cage fan with an electric motor.

12. The apparatus as claimed in claim 10 wherein said venturi tube comprises an air control valve, wherein said air control valve regulates the amount of air mixing with said small particles of said waste products.

13. The apparatus as claimed in claim 1 wherein said ignition tube is made of heat-resistant steel.

14. The apparatus as claimed in claim 1 wherein said ignition tube is made of ceramic-coated steel.

15. The apparatus as claimed in claim 1 wherein said ignition tube is made of a ceramic material.

16. The apparatus as claimed in claim 1 wherein said heat recovery means is a boiler.

17. Apparatus for the incineration of waste tires, said apparatus comprising:
    a. tire size-conversion means;
    b. particle conveying means;
    c. particle delivery means;

d. a modified furnace; and e. combustion product withdrawal means, wherein said tire size-conversion means converts while waste tires into small particles of waste tires, wherein said particle conveying means is affixed to said tire size-conversion means, wherein said particle conveying means transfers said small particles from said tire-conversion means to waste particle storage, wherein said particle delivery means is connected to said waste particle storage and to said modified furnace, wherein said particle delivery means transfers said small particles of said waste tires from said waste particle storage to an ignition tube positioned within said modified furnace, wherein said ignition tube is connected to said particle delivery means, wherein said small particles are transferred into said ignition tube at an upper furnace section by said particle delivery means, wherein said ignition tube is looped into a coil shape such that said small particles travel through said ignition tube in a downwardly spiraling motion and such that said small particles travelling through said ignition tube walls of said ignition tube, wherein said combustion product withdrawal means is affixed to said furnace, wherein said combustion product withdrawal means removes combustion gas products formed by the incineration of said small particles from said modified furnace, wherein said combustion gas products are drawn from said ignition tube at a lower furnace section, directed up past said ignition tube to contact exterior ignition tube walls of said ignition tube, and wherein said combustion product withdrawal means transfers said combustion gas products to heat recovery means.

18. The apparatus as claimed in claim 17 wherein said modified furnace is a contoured furnace such that said contoured furnace substantially conforms in shape to an outside diameter of said coil shape of said ignition tube, wherein the shape of said contoured furnace forces said hot combustion gas products exiting said ignition tube to be in close proximity to said exterior ignition tube walls.

19. The apparatus as claimed in claim 17 further comprising a supplemental air inlet of said modified furnace wherein the incineration of any residual particles and any unoxidized gas components exiting said ignition tube may be aided by the addition of supplemental air from said supplemental air inlet.

20. The apparatus as claimed in claim 17 further comprising a coil plug positioned within an inside diameter of said coil shape of said ignition tube, wherein said coil plug substantially conforms to the shape of said inside diameter of said coil shape of said ignition tube, and wherein said coil plug prevents said any residual particles and any unoxidized gas components from existing said modified furnace up through the middle of said coiled ignition tube.

21. The apparatus as claimed in claim 20 wherein said coil plug is made of heat-resistant steel.

22. The apparatus as claimed in claim 20 wherein said coil plug is made of ceramic-coated steel.

23. The apparatus as claimed in claim 20 wherein said coil plug is made of ceramic material.

24. The apparatus as claimed in claim 17 wherein said particle delivery means comprises:

a. a waste particle hopper;

b. particle blowing means;

c. a particle delivery tube;

d. a venturi tube; and e. a delivery tube connector, wherein said small particles of said waste tires are conveyed from said waste particle storage to said waste particle hopper, wherein said waste particle hopper is positioned above said modified furnace, wherein said particle blowing means is connected to said waste particle hopper, wherein said small particles are metered from said waste particle hopper into said particle blowing means, wherein said particle blowing means blows an air-particle mixture into said particle delivery tube, wherein said venturi tube is affixed to, and centered in, said particle delivery tube, wherein said venturi tube creates a partial vacuum within said particle delivery tube, thereby assisting the movement of said mixture through said particle delivery tube and into said ignition tube, wherein said delivery tube connector extends through an upper exterior wall of said modified furnace, and wherein said delivery tube connector connects said particle delivery tube to said ignition tube.

25. The apparatus as claimed in claim 24 wherein said particle blowing means is a squirrel-cage fan with an electric motor.

26. The apparatus as claimed in claim 24 wherein said venturi tube comprises an air control valve, wherein aid air control valve regulates the amount of said combustion air mixing with said small particles of said waste tires.

27. The apparatus as claimed in claim 17 wherein said ignition tube is made of heat-resistant steel.

28. The apparatus as claimed in claim 17 wherein said ignition tube is made of ceramic-coated steel.

29. The apparatus as claimed in claim 17 wherein said ignition tube is made of a ceramic material.

30. The apparatus as claimed in claim 17 wherein said heat recovery means is a boiler.

31. The apparatus as claimed in claim 17 wherein said ignition tube has an inside diameter of about 2 inches, wherein said ignition tube is coiled to form said coil shape with an inside diameter of about 20 inches, and wherein said ignition tube is coiled into three loops.

32. The apparatus as claimed in claim 17 wherein said tire size-conversion means comprises:

a. a spindle and debeading knives; and b. a contoured grinding wheel, wherein said waste tire is placed in an upright position on said spindle and rotated on said spindle, and wherein said debeading knives cut away tire beads of said waste tire, waste tire as said waste tire is rotated, so as to form a debeaded waste tire, wherein said contoured grinding wheel is positioned above said spindle, wherein said contoured grinding wheel is contoured to conform essentially to the shape of said debeaded tire such that an abrasive surface of said contoured grinding wheel can grind away essentially all rubber of sidewalls and a tread of said debeaded tire, and wherein when an abrasive surface of said contoured grinding wheel removes essentially all rubber from said debeaded tire, thereby forming a tire carcass.

33. The apparatus as claimed in claim 32 wherein said tire-size conversion means further comprises a secondary grinding device for breaking down said tire carcass to said small particles of said waste tires, said secondary grinding device comprising:

a. a carcass chamber;

b. a secondary grinding wheel; and c. a hydraulically-driven head plate, wherein a plurality of tire carcasses are placed within said carcass chamber upon removal from said spindle, wherein said hydraulically-driven head plate is contained within said carcass chamber, wherein said head plate forces said plurality of tire carcasses to contact said secondary grinding device, and wherein said secondary grinding wheel grinds said plurality of tire carcasses to form said small particles.

34. Process for the incineration of difficult-to-dispose-of waste products, said process comprising the steps of:
   a. preheating with supplemental heating means an interior section of a modified furnace to the ignition temperature of said waste products;
   b. transferring small particles of said waste products by particle conveying means from waste particle storage to an ignition tube positioned within said modified furnace, wherein said ignition tube is looped into a coil shape within said modified furnace, and wherein said small particles are transferred to said ignition tube at an upper exterior section of said modified furnace;
   c. directing said small particles into said ignition tube by particle delivery means such that said small particles are mixed with combustion air and directed down through said ignition tube in a spiraling motion, wherein said small particles are ignited as they contact interior ignition tube walls of said ignition tube;
   d. shutting off said supplemental heating means and using the heat generated by the incineration of said small particles of said waste products to ignite said small particles entering said ignition tube;
   e. drawing combustion gas products from said ignition tube at a lower furnace section by combustion product withdrawal means, wherein said combustion gas products are formed by the incineration of said small particles;
   f. directing said gas products up past exterior ignition tube walls of said ignition tube and into an upper interior furnace section; and
   g. transferring said combustion gas products from said upper interior furnace section to heat recovery means.

35. The process as claimed in claim 34 further comprising the step of converting bulk quantities of said waste products into said small particles of said waste products by waste product size-conversion means.

36. The process as claimed in claim 35 wherein said waste product size-conversion means is a grinder means.

37. The process as claimed in claim 34 wherein said modified furnace is a contoured furnace such that said contoured furnace substantially conforms in shape to an outside diameter of said coil shape of said ignition tube, wherein said contoured shape provides the further step of forcing said combustion gas products exiting from said ignition tube to contact said exterior ignition tube walls.

38. The process as claimed in claim 34 wherein said supplemental heating means is an oil-fired burner gun.

39. The process as claimed in claim 34 further comprising the step of providing supplemental air to said modified furnace by a supplemental air inlet, wherein said supplemental aid aids in the further incineration of any residual particles and any unoxidized gas components exiting from said ignition tube.

40. The process as claimed in claim 34 wherein a coil plug is positioned within an inside diameter of said coil shape of said ignition tube, wherein said coil plug substantially conforms to the shape of said inside diameter of said coil shape of said ignition tube, and wherein said coil plug prevents said combustion gas products, any residual particles, and any unoxidized gas components from exiting said modified furnace via the center of said coiled ignition tube.

41. The process as claimed in claim 34 wherein said particle delivery means comprises:
   a. a waste particle hopper;
   b. particle blowing means;
   c. a particle delivery tube;
   d. a venturi tube; and
   e. a delivery tube connector,
wherein said small particles of said waste products are conveyed from said waste particle storage to said waste particle hopper, wherein said waste particle hopper is positioned above said modified furnace, wherein said particle blowing means is connected to said waste particle hopper, wherein said small particles are metered from said waste particle hopper into said particle blowing means, wherein said particle blowing means blows an air-particle mixture into said particle delivery tube, wherein said venturi tube is affixed to, and centered in, said particle delivery tube, wherein said venturi tube creates a partial vacuum within said particle delivery tube, thereby assisting the movement of said mixture through said particle delivery tube and into said ignition tube, wherein said delivery tube connector extends through an upper exterior wall of said modified furnace, and wherein said delivery tube connection connects said particle delivery tube to said ignition tube.

42. The appparatus as claimed in claim 41 wherein said particle blowing means is a squirrel-cage fan with an electric motor.

43. The apparatus as claimed in claim 41 wherein said venturi tube comprises an air control valve, wherein said air control valve regulates the amount of air mixing with said small particles of said waste products.

44. Process of the incineration of waste tires, said process comprising the steps of:
   a. converting whole waste tires into small particles of said waste tires by tire-size conversion means;
   b. conveying said small particles from said tire-size conversion means to waste particle storage;
   c. preheating with supplemental heating means an interior section of a modified furnace to the ignition temperature of said waste tires;
   d. transferring said small particles from said waste particle storage to an ignition tube position within said modified furnace, wherein said ignition tube is looped into a coil shape, and wherein said small particles are transferred to said ignition tube at an upper exterior section of said furnace;
   e. directing said small particles into said ignition tube by particle delivery means such that said small particles are mixed with combustion air and directed down through said ignition tube in a spiraling motion, wherein said small particles are ignited as they contact interior ignition tube walls of said ignition tube;
   f. shutting off said supplemental heating means and using the heat generated by the incineration of said small particles of said waste tires to ignite said small particles entering said ignition tube;
   g. drawing combustion gas products from said ignition tube at a lower furnace section by combustion product withdrawal means, wherein said combustion gas products are formed by the incineration of said small particles;

h. directing said gas products up past exterior ignition tube wall of said ignition tube and into an upper interior furnace section; and i. transferring said combustion gas products from said upper interior furnace section to heat recovery means.

45. The process as claimed in claim 44 wherein said particle delivery means comprises:
   a. a waste particle hopper;
   b. particle blowing means;
   c. a particle delivery tube;
   d. a venturi tube; and
   e. a delivery tube connector, wherein said small particles of said waste tires are conveyed from said waste particle storage to said waste particle hopper, wherein said waste particle hopper is positioned above said modified furnace, wherein said particle blowing means is connected to said waste particle hopper, wherein said small particles are metered from said waste particle hopper into said particle blowing means, wherein said particle blowing means blows an air-particle mixture into said particle delivery tube, wherein said venturi tube is affixed to, and centered in, said particle delivery tube, wherein said venturi tube creates a partial vacuum within said particle delivery tube, thereby assisting the movement of said mixture through said particle delivery tube and into said ignition tube, wherein said delivery tube connector extends through an upper exterior wall of said modified furnace, and wherein said delivery tube connector connects said particle delivery tube to said ignition tube.

46. The process as claimed in claim 44 wherein said tire size-conversion means comprises:
   a. a tire-bead removal device comprising a spindle and debeading knives;
   b. a contoured grinding wheel; and
   c. a secondary grinding device comprising:
      i. a carcass chamber;
      ii. a hydraulically-driven head plate; and
      iii. a secondary grinding wheel, wherein said waste tire is placed in an upright position on said spindle and roated on said spindle, and wherein said debeading knives cut away tire beads of said waste tire as said waste tire is rotated, so as to form a debeaded waste tire, wherein said contoured grinding wheel is positioned above said spindle, wherein said contoured grinding wheel is contoured to conform essentially to the shape of said debeaded tire such that an abrasive surface of said contoured grinding wheel can grind away essentially all rubber of sidewalls and a tread of said debeaded tire, and wherein when an abrasive surface of said contoured grinding wheel removes essentially all rubber from said debeaded tire, thereby forming a tire carcass, wherein a plurality of tire carcasses are place within said carcass chamber upon removal from said spindle, wherein said hydraulically-driven head plate is contained within said carcass chamber, wherein said head plate forces said plurality of tire carcasses to contact said secondary grinding device, and wherein said secondary grinding wheel grinds said plurality of tire carcasses to form said small particles.

* * * * *